(12) United States Patent
Orme

(10) Patent No.: US 9,163,364 B2
(45) Date of Patent: Oct. 20, 2015

(54) MATERIALS

(75) Inventor: Chesney Orme, Kettleshulme (GB)

(73) Assignee: Sudscape Technologies Limited, Staffordshire (GB)

( * ) Notice: Subject to any disclaimer, the term of this patent is extended or adjusted under 35 U.S.C. 154(b) by 0 days.

(21) Appl. No.: 13/261,095

(22) PCT Filed: Jun. 23, 2010

(86) PCT No.: PCT/GB2010/001241
§ 371 (c)(1),
(2), (4) Date: Sep. 4, 2012

(87) PCT Pub. No.: WO2010/149973
PCT Pub. Date: Dec. 29, 2010

(65) Prior Publication Data
US 2012/0321390 A1    Dec. 20, 2012

(30) Foreign Application Priority Data

Jun. 25, 2009 (GB) .................................. 0910956.2

(51) Int. Cl.
| | | |
|---|---|---|
| *B65G 5/00* | (2006.01) | |
| *E01C 7/30* | (2006.01) | |
| *E01C 7/26* | (2006.01) | |
| *E01C 11/22* | (2006.01) | |

(52) U.S. Cl.
CPC . *E01C 7/30* (2013.01); *E01C 7/265* (2013.01); *E01C 11/226* (2013.01); *Y10T 428/249981* (2015.04)

(58) Field of Classification Search
USPC .................. 405/52–55; 404/32, 44
See application file for complete search history.

(56) References Cited

U.S. PATENT DOCUMENTS

| | | | | |
|---|---|---|---|---|
| 3,690,227 | A * | 9/1972 | Welty et al. | 404/2 |
| 3,801,421 | A * | 4/1974 | Allen et al. | 428/17 |
| 4,107,100 | A | 8/1978 | Peterhans et al. | |
| 5,352,158 | A * | 10/1994 | Brodeur, Jr. | 472/92 |
| 5,375,940 | A * | 12/1994 | Kobayashi | 404/2 |
| 5,391,226 | A * | 2/1995 | Frankowski | 106/696 |
| 5,436,285 | A * | 7/1995 | Causyn et al. | 524/68 |
| 5,492,434 | A * | 2/1996 | Adams et al. | 405/36 |
| 5,511,899 | A * | 4/1996 | Pavelek, II | 404/31 |
| 5,558,704 | A * | 9/1996 | Masuda et al. | 106/281.1 |
| 5,624,078 | A * | 4/1997 | Bredbeck | 241/24.14 |
| 5,993,897 | A | 11/1999 | Bowers et al. | |
| 6,095,718 | A * | 8/2000 | Bohnhoff | 405/52 |
| 6,702,514 | B2 * | 3/2004 | Kaneko et al. | 404/32 |
| 6,884,507 | B2 * | 4/2005 | Lin et al. | 428/402.21 |
| 7,351,772 | B2 * | 4/2008 | Yano et al. | 525/412 |
| 2004/0069924 | A1 | 4/2004 | Lemieux et al. | |
| 2006/0124031 | A1 | 6/2006 | Butler et al. | |

(Continued)

FOREIGN PATENT DOCUMENTS

| | | |
|---|---|---|
| DE | 4100581 A1 | 7/1992 |
| EP | 0165895 A1 | 12/1985 |

(Continued)

OTHER PUBLICATIONS http://www.merriam-webster.com/dictionary/around.*

*Primary Examiner* — Sean Andrish
(74) *Attorney, Agent, or Firm* — Schwartz Law Firm, P.C.

(57) ABSTRACT

A composite surface material comprising a permeable substrate and a permeable surface layer bonded to the substrate so that the material is permeable.

2 Claims, 3 Drawing Sheets

(56) References Cited

U.S. PATENT DOCUMENTS

2008/0104914 A1    5/2008  Lemieux
2013/0011195 A1*   1/2013  Bower et al. .................... 404/31

FOREIGN PATENT DOCUMENTS

| | | |
|---|---|---|
| EP | 0358209 A2 | 3/1990 |
| FR | 2703095 A1 | 9/1994 |
| GB | 767957 | 2/1957 |
| GB | 2 346 331 A | 8/2000 |
| JP | 63255403 A | 10/1988 |
| JP | 03100202 * | 4/1991 |
| JP | 9228308 A | 9/1997 |
| JP | 10140509 A | 5/1998 |
| JP | 2003026486 A | 1/2003 |
| JP | 2003301403 A | 10/2003 |
| JP | 2007002502 A | 1/2007 |
| KR | 20030012914 A | 2/2003 |
| KR | 20040052827 A | 6/2004 |
| WO | WO 95/07398 A | 3/1995 |

* cited by examiner

MATERIALS

BACKGROUND OF THE INVENTION

This invention relates to materials, particularly, but not exclusively, materials for surfacing paths, driveways, roadways and outdoor hard standing areas, methods of making them and methods of using them.

Porous sheet containing crumb rubber is known from GB767957, and is said to be useful as a carpet underlay or carpet backing. Sports and domestic surfaces made from materials including crumb rubber are known from US2006/0124031, the crumb rubber being incorporated in an asphalt matrix, and from US2008/0104814 and US 2004/0069924 in which an expanded polypropylene (EPP) product. is spread in situ or factory-formed into tiles or blocks and laid on a prepared base such as concrete or as a suspended floor, and covered with a surface finishing material of crumb rubber, hardwood flooring or carpet.

Crumb rubber is recovered from automobile and ground-running tyres, which contain wire. For use in surfacing materials, the rubber has to be completely separated from the wire, which would constitute a hazard, projecting randomly from the surface.

The present invention provides new surface materials, new ways of making them and new uses for them exhibiting substantial advantages over previous products.

BRIEF SUMMARY OF THE INVENTION

The invention comprises a composite surface material comprising a permeable substrate and a permeable surface layer on the substrate so that the material is permeable.

The substrate may comprise particulate material bound in a permeable resin matrix.

The particulate material may comprise a recycled material such as rubber crumb, which may be recovered from automobile and other ground wheel tyres. For most purposes for which shredded tyres are used, it is necessary for the crumb to be free from wire, sharp ends of which could be a hazard. However, for the present purpose, as the crumb is used in a substrate, it is not necessary to separate out all the wire, which results in a cost saving.

Other particulate materials can be used instead of or in addition to the rubber crumb, for example recycled nitrile rubber contaminated with poly vinyl chloride (pvc) recovered from scrapped window frames. The particulate material need not, of course, be or contain recycled material, but generally speaking recycled material is less expensive than new material.

The permeable resin matrix may set hard, so that the product is rigid.

The matrix may contain connected voids through which water can flow.

The permeable surface layer may comprise conventional paving or flooring material such for example as stone aggregate or chippings, rubber crumb, metal mesh and mosaic tiles as may be desired for the sake of appearance, wear, traction and other properties. Such material may be loose, or may also be bound in a resin matrix, which may comprise a similar resin system to that of the substrate, or a different system, but compatible therewith so that it can be bonded thereto.

Different resins may be used in the substrate and the surface layer, which may be set at different temperatures and which may be thermally bonded together at an elevated temperature. The resin in the substrate need have no special properties except to set and bond to the particulate inclusion, and can therefore be inexpensive. It may be desired, however, to use a resin in the surface layer that does not discolor in sunlight. The resin in any case may be a two-part resin.

The rubber crumb may have a particle size up to 100 mm, and the particles may be uniform in size or may have a range of sizes, e.g. between 50 mm and 100 mm, or 20 mm and 50 mm. Permeability may be entirely due to gaps between particles not being filled with the resin matrix. Generally, larger particles will result in larger gaps and greater permeability.

The ratio of resin to particulate material in the substrate may be between 6 and 15% by weight, and may in particular be 10%. In the surface layer, if stone aggregate is used, the ratio of resin to stone may be about 6% by weight.

The composite material may have a permeability such that surface water readily soaks through it, and may have a permeability of the order of 10,000 liters per square meter per hour, for instance, at least 1,000 liters per square meter per hour. Such a permeability allows rainwater to soak away—depending, of course, on the underlying ground condition—and the material is useful as a paving for hard standing in garden areas, for example, which might be paved over as a low maintenance area or for vehicular parking. Conventional impermeable paving, such as asphalt and slabs laid on concrete, over such areas has been cited as a cause of flooding by directing excessive volumes of rainwater into street drains that were not designed or are not maintained to cope with such volumes.

The composite material may be spread in situ in two steps, with the resin matrix of the substrate being allowed to cure, or at least partially cure, before spreading the surface layer.

The material may be spread as a dispersion of particles in a liquid resin, or the particles may be spread dry and resin poured or sprayed on to the particles.

Or the substrate may be spread, in either of the above fashions, and the surface layer separately formed as tiles or slabs, which are laid on top after the substrate resin system has cured or partially cured.

Or the composite material may be formed as two (or more) layer tiles or slabs.

In one method for making tiles or slabs, the rubber crumb substrate is first cast in a mold, then the surface layer cast on top of the substrate. The mold may be a two part mold having a lower part having a first depth for the substrate, allowing the substrate to be troweled or layered in to that first depth, and an upper part, that can be located on the lower part, having a second depth, into which the surface later can be cast. The mold may for instance be 450×450 mm square, the lower part having a depth of, say, 20 mm, the upper part having a depth of, say, 10 mm.

The mold may be fabricated out of a high molecular weight, high-density polyethylene or other material to which the resin systems do not adhere, or at lease have a release lining of such material. The tiles or slabs may be removed from the mould when cured or partially cured and stacked to cure completely before shipping or deployment.

The slabs or tiles may be made in a continuous process in which moulds are moved along a rack which may pass through ovens in which predetermined temperatures may be maintained.

The invention also comprises a water management system in which a pit is filled with a permeable substrate with a permeable surface layer thereon. The substrate may contain rubber crumb, and the surface layer may comprise stone aggregate, rubber crumb or any other particulate material with appropriate wear, appearance, traction and other properties, which may also be bound in a resin matrix. Such a pit may be filled with a homogeneous depth of material, with uniform particle size, or with a uniform range of particle sizes, or may be filled with a graded particle size distribution, for example, larger particles at the bottom, smaller at the top.

Such a pit may act as a soakaway to accommodate excess water from flash floods and feed it to drains, and may be provided with a pump, which may be automatically activated by, for example, a level sensor or moisture sensor, and may be powered from a battery charged by e.g. solar or wind energy.

BRIEF DESCRIPTION OF THE DRAWINGS

Embodiments of composite surface material, methods for making the same, and a water management system according to the invention will now be described with reference to the accompanying drawings, in which.

DETAILED DESCRIPTION OF THE INVENTION

The drawings illustrate a composite surface material 11 comprising a permeable substrate 12 and a permeable surface layer 13 bonded to the substrate 12 so that the material 11 is permeable.

Figure 6:
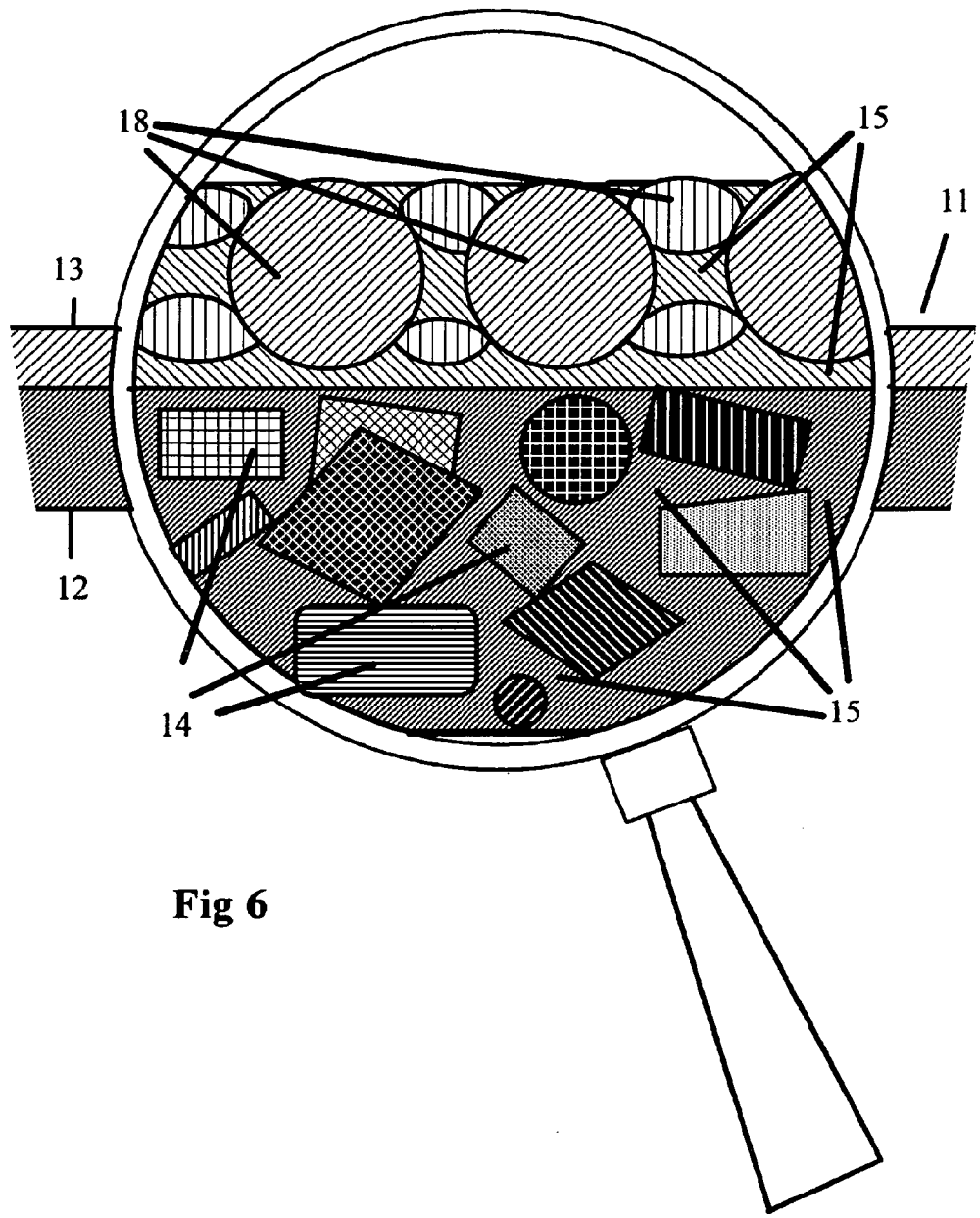
FIG. 6 is a view through a lens of the material of FIG. 1 in cross section.

The substrate 12 comprises particulate material 14 (FIG. 6) bound in a resin matrix 15.

The particulate material comprises rubber crumb 14, which can be recovered from tyres, from which wire has not necessarily been completely separated. As the crumb 14 is in a substrate, projecting ends of wire will not appear on the surface.

The resin matrix 15 is chosen so as to set hard, unlike carpet underlay, so that the product is rigid. The matrix 15 is not homogeneous, but contains connected voids, through which water may flow. This particularly results from the proportions of resin and particulate material in the mix, which is around 10% resin to 90% particulate material.

The rubber crumb has a particle size up to 100 mm, and the particles may be uniform in size or may have a range of sizes, e.g. between 50 mm and 100 mm, or 20 mm and 50 mm. Permeability is entirely due to interconnecting voids between particles. Generally, larger particles will result in larger interconnected voids and so greater permeability.

The permeable surface layer 13 comprises conventional paving or flooring material, in this instance, stone aggregate or chippings 18, although rubber crumb, metal mesh and mosaic tiles as may be desired for the sake of appearance, wear, traction and other properties. Such material is also bound in a resin matrix 15, which is chosen so as to be resistant to ultraviolet discoloration, but compatible with the resin of the substrate so that it can be bonded thereto. When different resins are used in the substrate and the surface layer, they may be set at different temperatures and may be thermally bonded together at an elevated temperature. In the substrate, a methylene diphenyl diisocyanate resin can be used, while a UV stabilised aliphatic polycyanate resin can be used in the surface layer 13. The ratio of resin to stone aggregate is about 6% resin to 94% stone—stone is denser than crumb, and the volume ratio is roughly the same. If a less dense particulate material is used, such as rubber crumb, the resin/particulate ratio will be higher, about 1:10 as for the substrate.

Figure 1:
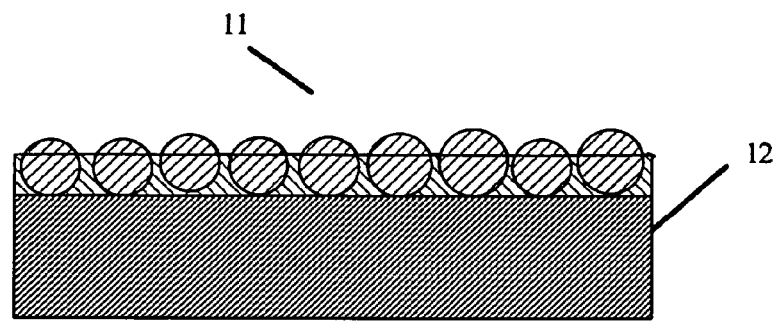
FIG. 1 is a section through one embodiment of surface material.
Figure 2:
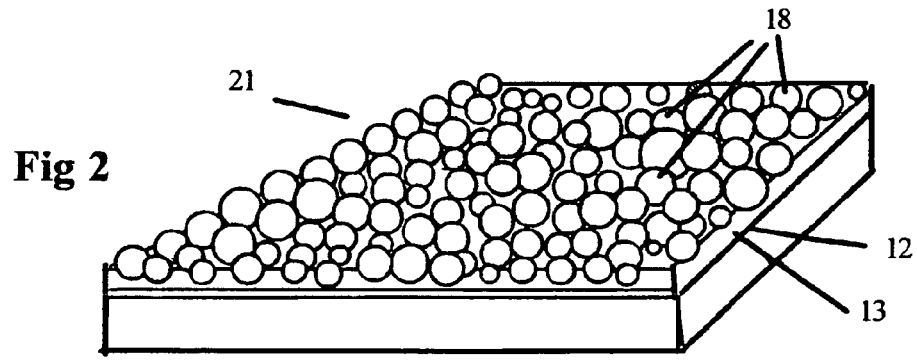
FIG. 2 is a perspective view of a slab or tile of the surface material of FIG. 1.

FIG. 2 illustrates a tile or slab 21 having the substrate and surface layers 12, 13, the latter incorporating stone aggregate 18. The tile or slab 21 can be of any desired dimensions, for example 450 mm×450 mm, with the substrate being 20 mm deep and the surface layer being 10 mm—in FIG. 2 the depth scale is exaggerated.

Figure 3:
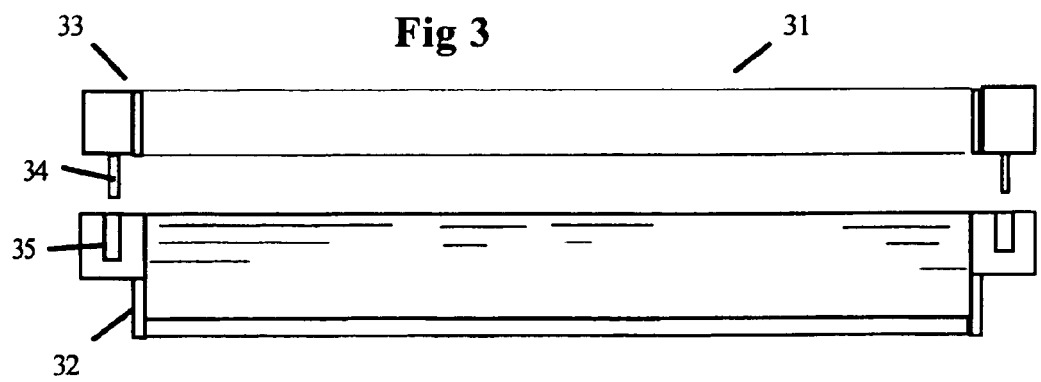
FIG. 3 is a side elevation of a mould for making the slab or tile of FIG. 2.

FIG. 3 illustrates a two-part mould 31 having a lower part 32 for forming the substrate 12 and a separate upper part 33 that registers with the lower part 32 by means of dowels 34 engaging in bores 35. With the upper part 32 removed, substrate material is loaded into the lower part 32, either as a dispersion of the rubber crumb in liquid resin, or by loading the crumb dry and pouring or spraying resin on top, and levelling off. When cured or partially cured, the upper part 33 is added, and the surface layer cast on top of the substrate. After curing or partial curing the resins may be activated to bond at an elevated temperature. The cured or partially cures slab or tile can be removed to be stacked for storage or transportation. The resins may complete their curing while so stacked.

The mold 31 can be made of plastics material from which the cured or partially cured slab or tile can be easily released, or made from e.g. metal components covered in such plastic. Likewise, a pallet on which the tiles are stacked might be covered in a release liner, which may also be interleaved with the tiles or slabs.

Figure 4:
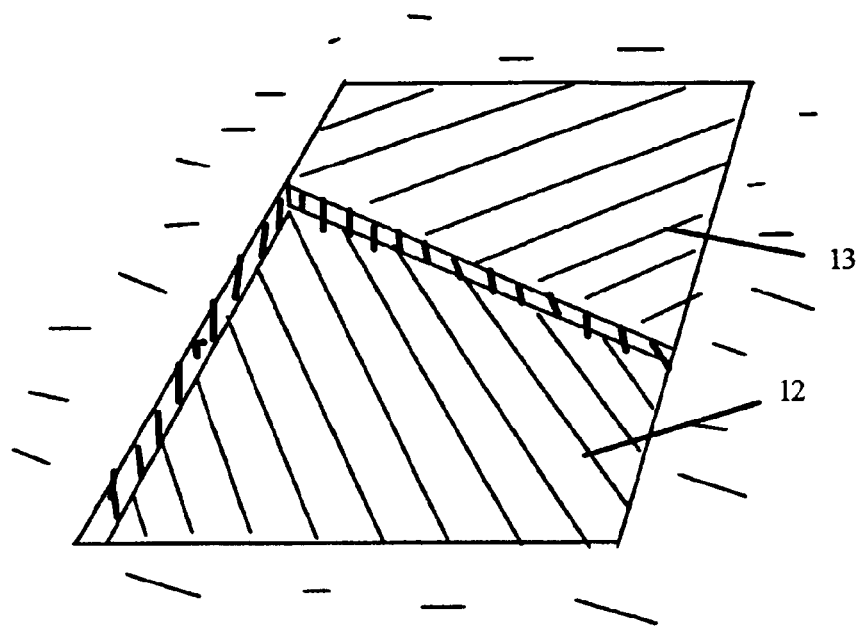
FIG. 4 is a perspective view of in situ laying a surface material.

FIG. 4 illustrates a method for laying a permeable surface layer in situ. In which the ground is excavated to the required depth and the substrate 12 is laid, either as a dispersion of rubber crumb in a liquid resin or as dry rubber crumb on to which liquid resin is sprayed or poured, and left to cure or partially cure after being leveled off by raking or rolling. The surface layer 13 is then applied in similar fashion, or it may be applied in the form of tiles as illustrated in FIG. 2, or even just as an upper layer formed into a tile without its substrate.

Figure 5:
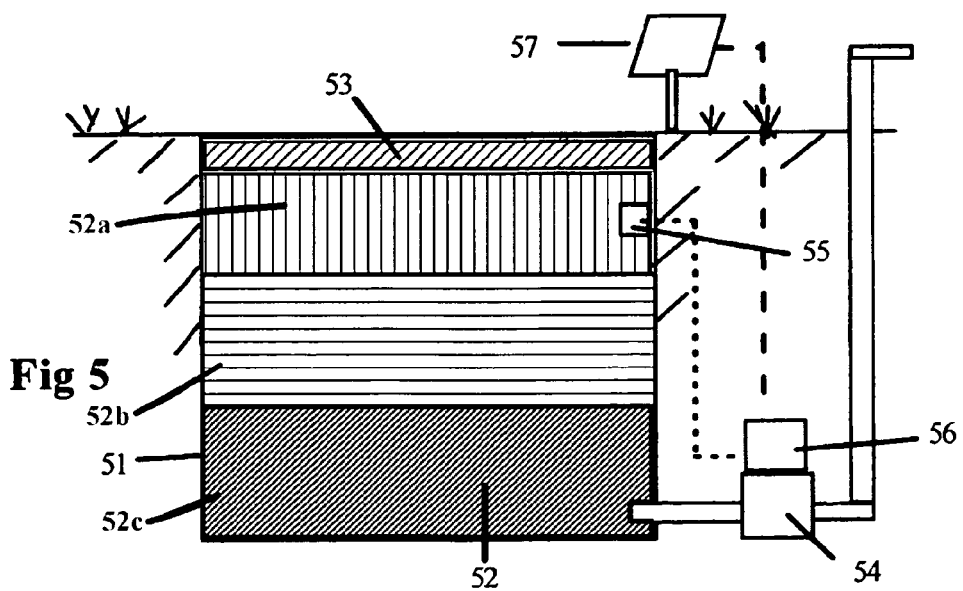
FIG. 5 is a cross section through a soakaway comprising another embodiment of surface material.

FIG. 5 illustrates a water management system comprising a pit 51 containing a resin/rubber crumb substrate 52 and a surface layer 53—this is essentially a tile like that illustrated in FIG. 2, but with substantially greater depth.

The substrate 52 is made in three parts, 52a, 52b and 52c in which uppermost layer 52a had crumb particle sizes of 50-100 mm. Layer 52b has particle sizes of 28-20 mm, and the lowermost layer 52c has particle sizes of 10-25 mm. The surface layer 53 includes stone aggregate as in FIG. 2.

This constitutes a soakaway capable of absorbing surface water very quickly. For severe or prolonged flooding, a pump 54 is activated by a level sensor 55 to pump water from the pit 51, whence it can be directed to street drains or otherwise. The pump is powered from a battery 56 charged by a solar panel 57.

Composite surface materials as described above can be used in numerous situations where management of water is required, for example in paths sand driveways, where the material may be laid on top of a geotextile barrier, for example for weed control, or in sea walls and sea defences, where the permeable nature of the material may dissipate wave forces, and for protection against erosion of beaches and dunes, and of river and canal banks.

The invention claimed is:

1. A water management system in which a pit is filled with a composite surface material, said composite surface material comprising a permeable substrate having a uniform particle size and a permeable surface layer on the substrate so that the material is permeable, and wherein the substrate comprises particulate material of homogenous depth and bound in a permeable resin matrix, the particulate material comprising a recycled material, and further wherein the surface layer comprises a stone aggregate, and further wherein the surface layer has a depth of at least 10 mm.

2. A water management system in which a pit is filled with a composite surface material, said composite surface material a permeable substrate and a permeable surface layer on the substrate so that the material is permeable, and wherein the substrate comprises particulate material bound in a permeable resin matrix, the particulate material comprising a recycled material, and further wherein the permeable substrate comprising particulate material has a larger particle size nearer to the top of the permeable substrate and a smaller particle size nearer to the bottom of the permeable substrate, and further wherein the surface layer comprises a stone aggregate, and further wherein the surface layer has a depth of at least 10 mm.

* * * * *